US007008478B2

(12) United States Patent
Park

(10) Patent No.: US 7,008,478 B2
(45) Date of Patent: Mar. 7, 2006

(54) COMPOSITE OF CONSOLIDATION-HARDENING PILE FOR SOFT GROUND

(75) Inventor: Kyung Tae Park, Seoul (KR)

(73) Assignee: Mirae Environment and Construction Co., Ltd., Seoul (KR)

( * ) Notice: Subject to any disclaimer, the term of this patent is extended or adjusted under 35 U.S.C. 154(b) by 0 days.

(21) Appl. No.: 11/093,505

(22) Filed: Mar. 30, 2005

(65) Prior Publication Data

US 2005/0217539 A1 Oct. 6, 2005

(30) Foreign Application Priority Data

Mar. 31, 2004 (KR) ...................... 10-2004-0022400
Mar. 18, 2005 (KR) ...................... 10-2005-0022816

(51) Int. Cl.
*C04B 7/34* (2006.01)
*C04B 7/13* (2006.01)
*C04B 7/153* (2006.01)

(52) U.S. Cl. ...................... 106/710; 106/705; 106/708; 106/709; 106/791; 106/792; 106/795

(58) Field of Classification Search ................ 106/705, 106/708, 709, 710, 791, 792, 795
See application file for complete search history.

(56) References Cited

U.S. PATENT DOCUMENTS

| 2,564,690 | A | * | 8/1951 | Havelin et al. | ............. | 106/710 |
| 2,698,252 | A | * | 12/1954 | Havelin et al. | ............. | 106/706 |
| 2,815,294 | A | * | 12/1957 | Havelin et al. | ............. | 106/706 |
| 2,942,993 | A | * | 6/1960 | Handy et al. | ................ | 106/706 |
| 3,076,717 | A | * | 2/1963 | Minnick | ...................... | 106/710 |
| 3,230,103 | A | * | 1/1966 | Minnick | ...................... | 106/707 |
| 3,854,968 | A | * | 12/1974 | Minnick et al. | ............. | 106/710 |
| 4,105,463 | A | * | 8/1978 | Angelbeck | ................... | 106/710 |
| 4,374,672 | A | * | 2/1983 | Funston et al. | ............. | 106/706 |
| 5,951,751 | A | * | 9/1999 | Williams et al. | ............ | 106/706 |
| 6,699,322 | B1 | * | 3/2004 | Laudet et al. | ................ | 106/792 |

FOREIGN PATENT DOCUMENTS

FR 2729657 A * 7/1996

OTHER PUBLICATIONS

Derwent Abstract No. 1982-67804E, abstract of Soviet Union Patent Specification No. 872496B (Oct./1981).*
Derwent Abstract No. 1985-164008, abstract of Soviet Union Patent Specification No. 1130549A (Dec./1984).*
Derwent Abstract No. 1988-359135, abstract of Soviet Union Patent Specification No. 1399286A (105/1988).*
Derwent Abstract No. 1989-233056, abstract of Soviet Union Patent Specification No. 1454986A (Jan./1989).*

* cited by examiner

*Primary Examiner*—Anthony J. Green
(74) *Attorney, Agent, or Firm*—Park Law Firm; John K. Park

(57) ABSTRACT

The present invention relates to a composite of consolidation-hardening pile for soft ground and in which a composition ratio of an aggregate:a quicklime:an additive is 50–60 wt %:20–25 wt %:20–25 wt %, and the additive is an admixture made by mixing a powder of furnace slag, a fly ash or a mixture of the powder of furnace slag and the fly ash in a cement, the ratio of the cement, and the powder of furnace slag, the fly ash or the mixture of the powder of furnace slag aggregate and the fly ash is 65–85 wt %:15–35 wt %. As the pile is formed in the soft ground vertically, a composite has a strength of 50 $kgf/cm^2$ or over to act as a supporting pile for sinking, and a reinforcing pile.

4 Claims, No Drawings

COMPOSITE OF CONSOLIDATION-HARDENING PILE FOR SOFT GROUND

CLAIMING FOREIGN PRIORITY

The applicant claims and requests a foreign priority, through the Paris Convention for the Protection of Industry Property, based on patent applications filed in the Republic of Korea (South Korea) with the filing date of Mar. 31, 2004 with Korean Patent Application No. 10-2004-0022400, and with the filing date of Mar. 18, 2005 with Korean Patent Application No. 10-2005-0022816, by the applicant. (See the attached Declaration)

BACKGROUND OF THE INVENTION

1. Technical Field

The present invention relates to a composite of consolidation-hardening pile for soft ground and, more particularly, a composite of consolidation-hardening pile for the soft ground, which is not only used in C.I.P. (Cast In place Pile) method using a cast-in-situ pile, but also in Chemical Pile method for making a pile by filling a quicklime (calcium oxide) in a hall to increase strength of the ground, and to prevent the ground from being sunken.

2. Background Art

Generally, there are various methods of construction to make the soft ground better. One of methods is a Chemical Pile method.

In addition, the C.I.P. method is one of the methods, which is used in a deep foundations construction.

Brief description of the methods is as follows.

A vertical pile is formed by first making a hall of 20–40 cm diameter in the soft ground and then, filling calcium oxide in the hall. The quicklime(calcium oxide) in the pile reacts with the moisture in the ground due to its chemical characteristic to originate an exothermic reaction of about 300° C., an absorption reaction[$CaO+H_2O \rightarrow Ca(OH)_2$], swelling effect, and ion exchange reaction. Thus, the amount of the moisture in the ground is reduced, and the pile acts as a consolidation in the horizontal direction is occurred by the swelling.

Therefore, a strength of the ground is increased, and sinking of the ground is prevented.

As the pile made by only the quicklime, however, has the strength of 5 $kg/cm^2$, it is inappropriate as a supporting pile. Further, there are problems that working safety is impeded by a rapid exothermic reaction, and an expensive exclusive apparatus should be used.

The C.I.P.(Cast In place Pile) method is a kind of a cast-in-situ concrete pile. The file is formed by first drilling the ground by means of an Earth Auger, and then, filling a coarse aggregate and a cement paste in the formed hall.

At this time, the diameter of pile is over 25 cm at the least, and is 30 cm, 45 cm, 60 cm or 90 cm.

The C.I.P. method is applied to the sediment-based ground by using a casing pipe, but not applied to the soft ground. Therefore, a ground improving effect is hardly produced.

DISCLOSURE OF THE INVENTION

Therefore, the present invention is devised to overcome above problems. An object of the present invention is to provide a composite of consolidation-hardening pile for soft ground capable of providing a reinforcing pile for an embankment and a supporting pile for the upper load through a strong strength of a material itself after a reaction of the material, which reduces a moisture content in the ground and promotes a consolidation in horizontal direction to increase a strength by means of forming a hall in the soft ground, having a high moisture content and a cohesive soil, and filling an admixture of a quicklime, an additive and an aggregate to react the admixture with the moisture in the ground.

In particular, other object of the present invention is to provide a composite of consolidation-hardening pile for soft ground, which can ensure a working safety as a temperature over or under 40° C. is produced when constructing, perform the constructing with a general equipment, and act as a supporting pile with 50 $kgf/cm^2$ after a reaction by solving the aforementioned problems that the conventional pile made by only the quicklime has the strength of 5 $kg/cm^2$ and is inappropriate as a supporting pile, the working safety is impeded by the rapid exothermic reaction of about 300° C. of the quicklime, and the expensive exclusive apparatus should be used.

Further, another object of the present invention is a composite of consolidation-hardening pile for soft ground which has endurance better than the conventional pile by the quicklime due to a consolidation effect by an additive.

BEST MODE FOR CARRYING OUT THE INVENTION

The objects of the present invention is achieved by a composite of consolidation-hardening pile for the soft ground, in which a composition ratio of an aggregate:a quicklime:an additive is 50–60 wt %:20–25 wt %:20–25 wt %, and the additive is an admixture made by mixing a powder of furnace slag, a fly ash or a mixture of the powder of furnace slag and the fly ash in a cement, the ratio of the cement, and the powder of furnace slag, the fly ash or the mixture of the powder of furnace slag aggregate and the fly ash is 65–85 wt %:15–35 wt %.

A bottom ash, the furnace slag or its compound can be used as the aggregate. An ion-exchange material of 4–5 wt % can be added to the additive. The ion-exchange material can be anyone of Zeolite or Lignin($Ca^+$).

An exampled of a composite of consolidation-hardening pile for soft ground according to the present invention will be described in below.

The composite of consolidation-hardening pile for the soft ground according to the present invention is a powder of mixture of quicklime+an additive+an aggregate. The composite in powder state is concreted in the soft ground to form a file.

The composite in powder state is reacted with moisture in the soft ground. According to the reaction, the soft ground is improved, and the strength of the file itself is increased with gradual.

The best mixing ratio of the aggregate:quicklime:the additive is 50–60 wt %:20–25 wt %:20–25 wt %.

In order to achieve 50 $kgf/cm^2$ of strength according to design, the mixing ratio is regulated. The grain size of the aggregate is controlled so as to harden the material in powder state by means of vibration.

The aggregate has a grain size distribution as shown in the table 1.

TABLE 1

Grain size distribution of aggregate

| | Sieve No. | | | | | | |
|---|---|---|---|---|---|---|---|
| | No. 4 (4.75) | No. 10 (2.00) | No. 20 (0.85) | No. 40 (0.425) | No. 60 (0.25) | No. 100 (0.150) | No. 200 (0.075) |
| Ratio of Passing (%) | 95~100 | 80~95 | 40~65 | 15~30 | 8~20 | 4~10 | 2~5 |

The mixing ratio of the quicklime+the additive+the aggregate is based on weight, and can be controlled according to target strength as shown in table 2.

TABLE 2

Mixing ratio of Composite

| | (Quicklime + Additive):Aggregate | | | |
|---|---|---|---|---|
| Quicklime:Additive | 1:0.5 | 1:1.0 | 1:1.5 | 1:2.0 |
| 100:0 | 6 kg/cm$^2$ | 4 kg/cm$^2$ | 8 kg/cm$^2$ | 7 kg/cm$^2$ |
| 90:10 | 11 kg/cm$^2$ | — | 16 kg/cm$^2$ | 10 kg/cm$^2$ |
| 80:20 | 14 kg/cm$^2$ | 25 kg/cm$^2$ | 22 kg/cm$^2$ | 16 kg/cm$^2$ |
| 70:30 | 29 kg/cm$^2$ | 23 kg/cm$^2$ | 27 kg/cm$^2$ | 23 kg/cm$^2$ |
| 60:40 | 17 kg/cm$^2$ | 57 v | 40 kg/cm$^2$ | 34 kg/cm$^2$ |
| 50:50 | 48 kg/cm$^2$ | 49 kg/cm$^2$ | 53 kg/cm$^2$ | 38 kg/cm$^2$ |

As will be seen from the table, the compressive strength, as well as the result, is most stable when the ratio of (quicklime+additive):aggregate is 1:1.5.

The materials used as the additive are cement, and a power of furnace slag and a fly ash for improving efficiency of cement. The material used as the aggregate is industrial by-products such as bottom ash and furnace slag.

The quicklime as main material in the composite for the pile according to the present invention is a ground improving material, that is, a material having low moisture content and a consolidation effect. The quicklime reacts with moisture in pores between grains of the ground to generate an exothermic reaction of about 300° C. and an absorption reaction [$CaO+H_2O \rightarrow Ca(OH)_2$], and is expanded. A $Ca^+$ ion isolated from $Ca(OH)_2$(slaked lime) performs an ion-exchange reaction with a positive ion of the grain of the ground to increase the strength of the ground. Further, as the powder of $Ca(OH)_2$(slaked lime) is reacted with moisture in pores between grains of the ground to produce the curing reaction, the moisture content in the ground is reduced and a consolidation-hardening in horizontal direction is occurred by the expansion.

The additives mixed with the quicklime are cement, the powder of furnace slag/fly ash, and the ion-exchange material.

In case that the bottom ash is used as the aggregate, the powder of furnace slag is added. In case of using the furnace slag as the aggregate, the additive is the additive.

The cement is a representative bonding agent to react with water to fix a structure. The main function of the cement is to increase the strength of the pile, and the sub-function is to reduce the moisture content in the ground and to have consolidation effect. 65 wt %–85 wt % of the cement to the additive is added.

The powder of furnace slag, exhibiting a bonding force in an alkali state, is a by-products of iron industry, and its main elements are CaO, $SiO_2$ and $Al_2O_3$, The reaction time of the furnace slag is slow compared with the quicklime and the cement to reduce the high temperature of about 300° C. generated at the initial reaction of the quicklime. Therefore, the working safety is increased, and the consolidation mechanism is continuously applied to the ground to increase the strength of the ground with continuous.

Further, when the furnace slag is in contact with water, a non-permeable acid film is formed on the surface of the slag not to harden the slag. As the acid film is broken by the calcium hydroxide($Ca(OH)_2$) produced from the reaction of the cement and quicklime and the slag is reacted, the strength of a solid structure(of potential hydraulicity) is increased for long time and a watertight structure is formed to suppress permeation of chlorine ion, and to increase a chemical resistance to a sulfate and sea water.

The powder of furnace slag is an admixture for improving the function of cement. If the power over fixed content is added, the strength of a structure is deteriorated. 15 wt %–35 wt % of the powder of furnace slag to the total additive weight is added.

The main element of the fly ash is $SiO_2$ and $Al_2O_3$ which reduce heat of hydration to suppress a creation of crack in a structure, to improve a watertight of the structure and to increase a resistance against freezing and thawing. In particular, the fly ash itself has not a hydraulicity, but reacts slowly with $Ca(OH)_2$ to create a stable insoluble calcium silicate hydrates (Pozzolan reaction), which is effective for long time strength. 15 wt %–35 w % of the fly ash to the total additive weight is added.

The ion-exchange material is a solid material for preventing an elution of a heavy metal. As a noxious heavy metal, although under an allowable standards, can be included in the bottom ash, and the slag used in the present invention, the ion-exchange material prevents the elution of noxious heavy metal from the bottom ash and the slag.

Zeolite, a kind of the ion-exchange material, is a porous aluminosilicates crystal formed by a tetrahedron of $SiO_4$, and $AlO_4$. The zeolite reacts with a positive ion of surrounding metal to maintain an electrical neutral.

By such ion-exchanging, the elution of surrounding noxious heavy metal can be prevented. 4 wt %–5 wt % of the ion-exchange material to total additive weight is added.

As shown in table 3, the content of noxious heavy metal in the bottom ash used as the aggregate in the present invention differs from country to country, from anthracite to bituminous coal, from a kind of coal to a kind of coal, and from content of coal to content of coal, but under allowable standards.

TABLE 3

Content of noxious heavy metal in coal bottom Ash (Based on Reclamation Bottom Ash)

| | Sample | Pb | Cu | As | Hg | Cd | $Cr^{6+}$ |
|---|---|---|---|---|---|---|---|
| Content (mg/l) | Anthracite | N | 0.005 | N | N | N | N |
| | Bitumionus coal | 0.1463 | 0.0008 | 0.0152 | N | 0.0073 | 0.0098 |

The bottom ash is by-products of a thermoelectric power plant, which is a reclamation bottom ash mixed by unused fly ash and thicker bottom ash. The physical characteristics and chemical component are shown in table 4 and table 5, respectively.

TABLE 4

Physical characteristics of bottom ash

| Test item | Specific gravity | #200 Ratio of passing | Content of chloride | Stability | Absorption rate | Remark |
|---|---|---|---|---|---|---|
| Bottom Ash | 2.22 | 4.7% | 0.086% | 7.6% | 4.76% | |

TABLE 5

Chemical characteristics of bottom ash

| | Component | | | | | | |
|---|---|---|---|---|---|---|---|
| | Al2O3 | SiO2 | MgO | SO3 | CaO | K2O | Fe2O3 | The rest |
| Content | 23.14 | 50.57 | 1.12 | — | 3.15 | 0.64 | 13.27 | 5.67 |

The bottom ash having the above characteristics is incongruent to fine aggregate standards for conventional concrete, and is not suitable for using as an aggregate for concrete. The bottom ash, however, exhibits physical characteristics which permit the bottom ash to be used in a portion having not a structural problem, or a special concrete such as lightweight concrete. Therefore, 50 wt %–60 wt % of the bottom ash is mixed to act as an aggregate in the present invention.

In particular, each of the materials is mixed and concreted in powder state. As the bottom ash has specific gravity smaller than that of conventional aggregates, and a porous structure formed in high temperature, the segregation of the bottom ash from other materials is reduced when concreting. As shown in table 4, as the absorption rate is 4 times higher than the conventional materials, it is effective for reducing moisture content in the ground when concreting.

The furnace slag aggregate is by-products obtained from the process for making pig iron, and is now widely used as a substitutive material for the concrete aggregate. In the present invention, the furnace slag aggregate defined in KS F 2544(Furnace slag aggregate for concrete) is mixed with 50 wt %–60 wt % to perform an aggregate function.

According to the present invention, the composite of consolidation-hardening pile for the soft ground has characteristics below.

① the moisture content in the ground is reduced by the exothermic reaction and the absorption reaction;
② the consolidation effect in horizontal direction is generated by the swelling to increase density of the ground;
③ shearing strength of cohesive soil is increased by the ion-exchanging reaction($Ca^+$); and
④ strength of the pile itself is increased up to 50 kgf/cm² in the course of reactions to obtain the effect of supporting pile.

For accompanying effect, as by-products, wastes, of a thermoelectric power plant, and a steel mill is used as an aggregate, there are effects of saving natural resources, reducing the expense for mining the natural resources, preserving environmental, solving a problem of securing a treating place for the bottom ash, and saving expense for transferring the bottom ash to the treating place. In addition, by using the wastes having characteristics, the pozzolan reaction and the potential hydraulicity in hardening, better than the natural resources, the improvement of the ground is increased.

Further, as the additive and the aggregate other than 100% quicklime are added to slow down the speed of reaction, the improvement of the ground is further increased by the slow reaction. The working safety is ensured by preventing the rapid exothermic reaction occurred for a few second.

Further, a construction work for making the pile according to the present invention can be performed by conventional equipments, as the diameter of the pile is smaller than the diameter of conventional Sand Compaction Pile made by large-sized special equipment, and the need of special equipment for the rapid exothermic reaction is eliminated. Therefore, the economical efficiency and the working safety are increased, and the environmental is improved by reduction of noise.

What is claimed is:

1. A composite of consolidation-hardening pile for soft ground, wherein said composite includes an aggregate, a quicklime, and an additive, a mixing ratio of the aggregate: the quicklime: the additive being 50 wt %–60 wt %: 20 wt %–25 wt %: 20 wt %–25 wt %; and
   the additive is an admixture made by mixing a powder of furnace slag or a fly ash in a cement, a compounding ratio of the cement and the powder of furnace slag or the fly ash being 65 wt %–85 wt %:15 wt %–35 wt %.

2. The composite of consolidation-hardening pile as claimed in claim 1, wherein the aggregate is one selected from the group consisting of a bottom ash, a furnace slag aggregate, and a mixture of the bottom ash and the furnace slag aggregate.

3. The composite of consolidation-hardening pile as claimed in claim 1, wherein the additive further includes an ion-exchange material, a ratio of the ion-exchange material to a total additive weight being 4 wt %–5 wt %, and the ion-exchange material is one selected from the group consisting of a Zeolite, and a Lignin($Ca^+$).

4. The composite of consolidation-hardening pile as claimed in claim 2, wherein the additive further includes an ion-exchange material, a ratio of the ion-exchange material to a total additive weight being 4 wt %–5 wt %, and the ion-exchange material is one selected from the group consisting of a Zeolite, and a Lignin($Ca^+$).

* * * * *